Patented Nov. 24, 1925.

1,562,805

UNITED STATES PATENT OFFICE.

THEODOR SUTTER, OF MONTHEY, SWITZERLAND, ASSIGNOR TO THE FIRM SOCIETY OF CHEMICAL INDUSTRY IN BASLE, OF BASEL, SWITZERLAND.

PROCESS FOR SEPARATING POTASSIUM AND SODIUM HYDROXIDES.

No Drawing.     Application filed May 8, 1925. Serial No. 28,951.

*To all whom it may concern:*

Be it known that I, THEODOR SUTTER, a citizen of the Swiss Confederation, residing at Monthey, Switzerland, have invented a new and useful Process for Separating Potassium and Sodium Hydroxides, of which the following is a full, clear, and exact specification.

A process for the separate separation of potash and soda from their mixtures in aqueous solutions has not hitherto been known notwithstanding that mixtures of these alkalies occur in various technical processes and their complete separation or the enrichment of the solution in one or other of the components for the purpose of obtaining a desired composition of the mixture is a great technical importance.

When aqueous mixtures of the two alkalies, containing for example equimolecular proportions of potash and soda, are evaporated until crystallization occurs on cooling the mixture of crystals obtained has approximately the composition of the parent material, so that it might be supposed that the hydroxides or hydroxyhydrates of the alkalies crystallize like the carbonates in the form of molecular compounds of the bases.

The present invention relates to a process for separating mixtures of potassium and sodium hydroxides, according to which, in order to separate potassium hydroxide, the mixture is concentrated until crystallization occurs in part at relatively high temperature, whereupon the potassium hydroxide crystals formed are eliminated from the mother liquor also at raised temperature, and, in order to separate sodium hydroxide the mixture is diluted in such a manner that partial crystallization occurs only at relatively low temperature, whereupon the sodium hydroxide crystals formed are eliminated from the mother liquid also at low temperature.

It has been found that a practically pure potassium hydroxide crystallizes from mixtures or solutions relatively rich in potassium hydroxide above certain concentrations and temperatures which vary according to the composition of the mixtures, while the hydrated sodium hydroxide remains in liquid condition. By centrifuging the crystals a mother liquor is obtained which is considerably poorer in potassium hydroxide than the original mixture. By further cooling of the liquor crystals separate which are considerably richer in sodium hydroxide than the original liquor but still containing considerable quantities of potassium hydroxide. If, however, the mother liquor is first diluted after separation of the potassium hydroxide, and then cooled, almost pure crystals of hydrated sodium hydroxide separate. The remaining mother liquor has approximately the composition of the original liquor. It can be brought again to the original composition and subjected to the same treatment.

As a rule the alkali which prevails more or less in the mixture is preferably eliminated first. If for instance there is in the mixture less than 35% of potassium hydroxide, the sodium hydroxide is eliminated first. Mixtures containing more than 35% of potassium hydroxide are treated first in order to separate the most potassium hydroxide possible, whereafter the sodium hydroxide is separated from the mother liquor.

In order further to purify the crystals, they may be dissolved in a small quantity of water and the process of separation repeated at a suitable temperature and concentration.

It is clear that the invention is also applicable for obtaining aqueous mixtures of potassium and sodium hydroxides of desired composition in respect of content of these two hydroxides, or to enriching such a mixture in either constituent as may be suitable for any particular technical purpose.

The following examples illustrate the invention:—

*Example 1.*

A purified alkali solution containing equal parts by weight of potash and soda is evaporated to 60° Baumé and stirred with blades at about 60° C. in a crystallizing vat until there is no further increase of crystals. The mass is thoroughly centrifuged in a heated centrifuging machine whereupon the separated crystals consist of practically pure hydrated potassium hydroxide. The mother liquor is diluted to about 55° Baumé and stirred, while cooling by means of flowing water. The separated crystals contain only 8–10 per cent of potash, while the mother liquor contains about 50 per cent. This liquor may be again concentrated to 60°

Baumé and treated further in the same manner.

Example 2.

An alkali solution containing 30 parts by weight of potash and 70 parts by weight of soda is diluted at about 50° C. to about 56° Baumé and cooled while stirring. There separates nearly pure hydrated sodium hydroxide which can be freed from the residue of adhering potash by corresponding dilution and fresh crystallization.

Example 3.

An alkali solution containing 60 parts of potash and 40 parts of soda is concentrated to 61° Baumé, and crystallized at 70° C. The centrifuged crystals contain over 90 per cent of potash.

Example 4.

An alkali solution containing 55 parts of potash and 45 parts of soda is concentrated to 59° Baumé and stirred for some time at 40° C. and finally centrifuged. The crystals obtained are nearly pure hydrated potassium hydroxide. The mother liquor is worked up as described in Example 1 or 2.

What I claim is:

1. The herein described process for the separation of mixtures of potassium hydroxide and sodium hydroxide, according to which, in order to separate potassium hydroxide, the mixture is concentrated until crystallization occurs in part at relatively high temperature, whereupon the potassium hydroxide crystals formed are eliminated from the mother liquor also at raised temperature, and, in order to separate sodium hydroxide, the mixture is diluted in such a manner that partial crystallization occurs only at relatively low temperature, whereupon the sodium hydroxide crystals formed are eliminated from the mother liquor also at low temperature.

2. The herein described process for the separation of mixtures of potassium hydroxide and sodium hydroxide, according to which, in order to separate potassium hydroxide, the mixture is concentrated until crystallization occurs in part at relatively high temperature, whereupon the potassium hydroxide crystals formed are eliminated from the mother liquor also at raised temperature, and, in order to separate sodium hydroxide, the mixture is diluted in such a manner that partial crystallization occurs only at relatively low temperature, whereupon the sodium hydroxide crystals formed are eliminated from the mother liquor also at low temperature, the alkali prevailing in the mixture being separated first.

In witness whereof I have hereunto signed my name this 21st day of April, 1925.

THEODOR SUTTER.